Oct. 19, 1954 L. R. KAHN 2,692,330

NOISE REDUCTION ARRANGEMENT

Filed May 22, 1950 2 Sheets-Sheet 1

INVENTOR
Leonard R. Kahn
BY Harry Tonick
ATTORNEY

Oct. 19, 1954 L. R. KAHN 2,692,330

NOISE REDUCTION ARRANGEMENT

Filed May 22, 1950 2 Sheets-Sheet 2

INVENTOR
Leonard R. Kahn
BY Harry Tunick
ATTORNEY

Patented Oct. 19, 1954 2,692,330

UNITED STATES PATENT OFFICE 2,692,330

NOISE REDUCTION ARRANGEMENT

Leonard R. Kahn, New York, N. Y., assignor to Radio Corporation of America, a corporation of Delaware Application May 22, 1950, Serial No. 163,521

The terminal 15 years of the term of the patent to be granted has been disclaimed 1 Claim. (Cl. 250—6)

This invention relates to an arrangement for reducing noise. More particularly, it relates to an arrangement for reducing noise in a frequency shift keyed (FSK) telegraphy system.

It has been found that in FSK telegraphy certain advantages are obtained by superimposing phase modulation (PM) on the FSK signals. The PM gives a frequency diversity effect, thus reducing fading effects. The bandwidth required is, of course, somewhat higher when PM is superimposed on the FSK signals. Conventional frequency shift adaptors need modifications in order to better utilize the advantages of superimposed PM.

Accordingly, an object of this invention is to devise a receiver in which conventional frequency shift adaptors may be used, without any modification, for superimposed PM.

Another object is to narrow the filter bandwidth requirements in a receiver for FSK signals with superimposed PM.

A further object is to reduce the noise in an FSK PM receiver.

A still further object is to cancel some of the noise energy in an FSK receiver utilizing separate mark and space filters in the frequency shift adaptor.

The foregoing and other objects of the invention will be best understood from the following description of an example thereof, reference being had to the accompanying drawings, wherein.

The objects of this invention are accomplished, briefly, in the following manner: FSK signals having superimposed PM are transmitted from a suitable transmitter. The PM is at a predetermined known rate or frequency. At the receiver, the PM modulating frequency is obtained from the composite signal and used to phase modulate the local heterodyne oscillator. This will produce, at the output of the mixer, the FSK signal without PM. This is passed through a filter having a narrow bandwidth to a frequency shift adaptor. Noise is phase modulated by the action of the modulated local oscillator, spreading the noise energy.

Figure 1:
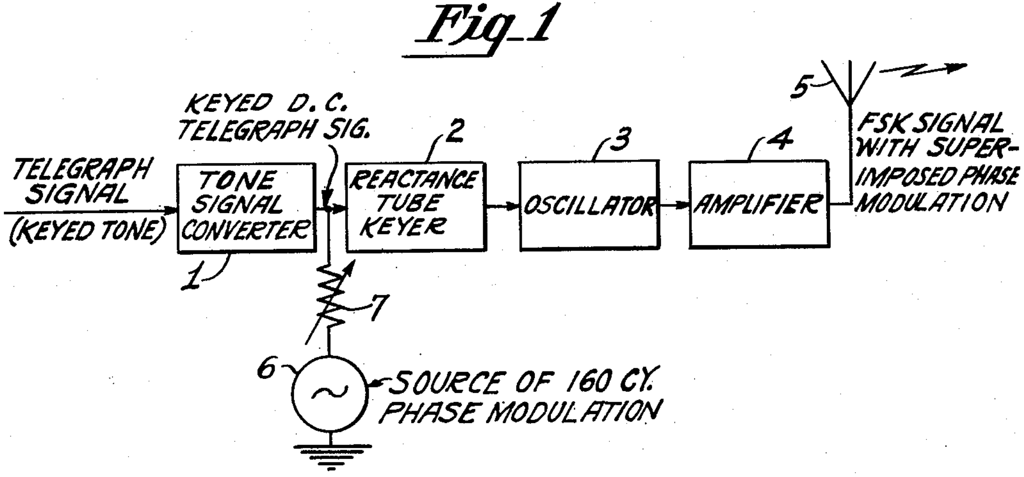
Fig. 1 is a simplified diagram of a transmitter usable in the system of the invention.

Now referring to Fig. 1, keyed tone telegraph signal from a suitable tone keyer is supplied to a tone signal converter 1. The keyed tone represents two different signalling conditions alternatively present, one being mark and the other, space. Converter 1 converts the keyed tone input to keyed direct current output. The output of converter 1 goes to a reactance tube keyer 2 which frequency shifts or frequency modulates an oscillator 3 to which it is coupled. The keyed direct current acts through keyer 2 to shift the frequency of oscillator 3 between two values, one representing mark and the other, space. These two frequencies are alternatively present. The elements just described constitute the main elements of an FSK transmitter. As a typical example, the frequency shift of oscillator 3, from mark to space, may be 1000 cycles. The output of oscillator 3 is fed through an amplifier 4 to transmitting antenna 5.

A source of modulating frequency 6 is fed through an amplitude adjusting device 7 to keyer 2. Source 6 may have a frequency of 160 cycles, for example. This source operates to phase modulate oscillator 3 at a 160-cycle rate and at a modulation index of 1.4 radians, for example. In other words, the output of oscillator 3 consists of FSK signals having superimposed PM. With the values given, the width of the entire or composite signal would be about 1800 cycles. For single channel printer operation, the intelligence frequency has a fundamental rate of approximately 22 C. P. S. This is the intelligence frequency which determines the rate at which the frequency of oscillator 3 is shifted from one value to another value 1000 C. P. S. away. Thus, the particular predetermined frequency (160 C. P. S.) of source 6, which phase modulates oscillator 3, is higher than the intelligence frequency (basically 22 C. P. S.).

The transmitting arrangement of Fig. 1 is quite conventional and is not being claimed separately herein, so will not be further described.

Figure 2:
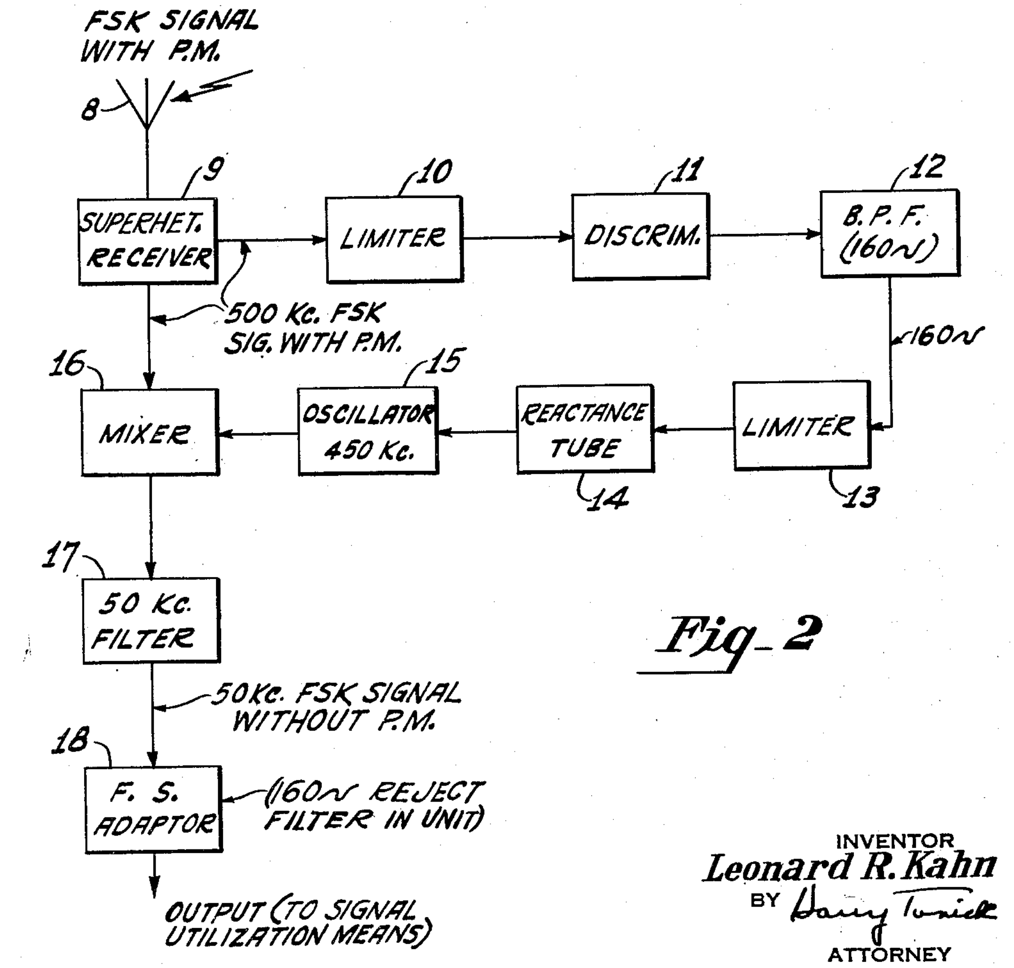
Fig. 2 is a block diagram of a receiver according to the invention.

Fig. 2 discloses a receiver which may be used in this invention. The transmitted FSK signal with PM thereon at the 160-cycle rate is collected by receiving antenna 8. It is applied to the input of a superheterodyne receiver 9. In 9 it is converted to an intermediate frequency of say 500 kc. A portion of the output of receiver 9 is fed to a limiter 10. Limiter 10 may be of any suitable type, such as the Crosby limiter of Patent #2,276,565, dated March 17, 1942. Limiter 10 functions in a well-known way to remove amplitude varations from the received signal.

The limited output of 10 is fed to a discriminator 11 of any suitable type. The effect of this discriminator is to abstract modulating frequencies from the carrier and supply such modulating frequencies at its output. In the discriminator output there appears, among other frequencies, the 160-cycle phase modulating frequency put on at the transmitter. A bandpass filter 12, to which the discriminator output is fed, allows only the 160-cycle superimposed phase modulating frequency to pass. The 160-cycle oscillations are limited by limiter 13 and fed to a reactance tube 14.

The reactance tube 14 is of any suitable type and is coupled to phase modulate a 450-kc. oscillator 15. The reactance tube 14 phase modulates oscillator 15 at a rate of 160 cycles and a modulation index of 1.4 radians, the same as the PM put on at the transmitter. It will be appreciated, however, that in this system the circuit constants at the receiver may be so chosen, if desired, as to provide a modulation index larger or smaller than that used at the transmitter.

Oscillator 15 is a local heterodyne oscillator the output of which is coupled to a mixer 16. Mixer 16 also receives the remainder of the output of receiver 9. The phase modulated 450 kc. oscillations are fed to mixer 16, where they beat with the receiver's output.

The output of the receiver 9 consists of a 500-kc. FSK signal with PM, furnished by the transmitter, and noise. PM is superimposed on the desired signal at the transmitter and appears at the output of 9. However, since the noise does not ordinarily originate in the transmitter, it is not phase modulated at the output of 9. Since the heterodyne oscillator 15 is phase modulated equally with the PM at the transmitter, beating action in 16 will produce at the output thereof, phase modulated noise and the desired FSK signal without the superimposed PM. In other words, the PM components of the FSK signal are removed in mixer 16, while the noise is phase modulated therein.

The signal output of mixer 16 is fed through the 50 kc. filter 17 to any conventional frequency shift adaptor 18 the output of which goes to a signal utilization means.

Since the PM components of the signal are removed in 16, the 50-kc. filter 17 need have a bandwidth of only 1200 cycles, instead of 1800 cycles, as would be the case if they were not so removed. In other words, the filters following mixer 16 can be 1200 cycles wide instead of 1800 cycles, as required for passing the FSK phase modulated signal. This narrow bandwidth will improve the signal-to-noise ratio.

Any conventional frequency shift adaptor may be used at 18 for superimposed PM, by the present invention, since before the signal gets to the frequency shift adaptor the PM is removed. Therefore, the advantages of superimposed PM, as regards reduction of fading, etc., may be retained without requiring any modifications of the conventional frequency shift adaptors.

Figure 3:
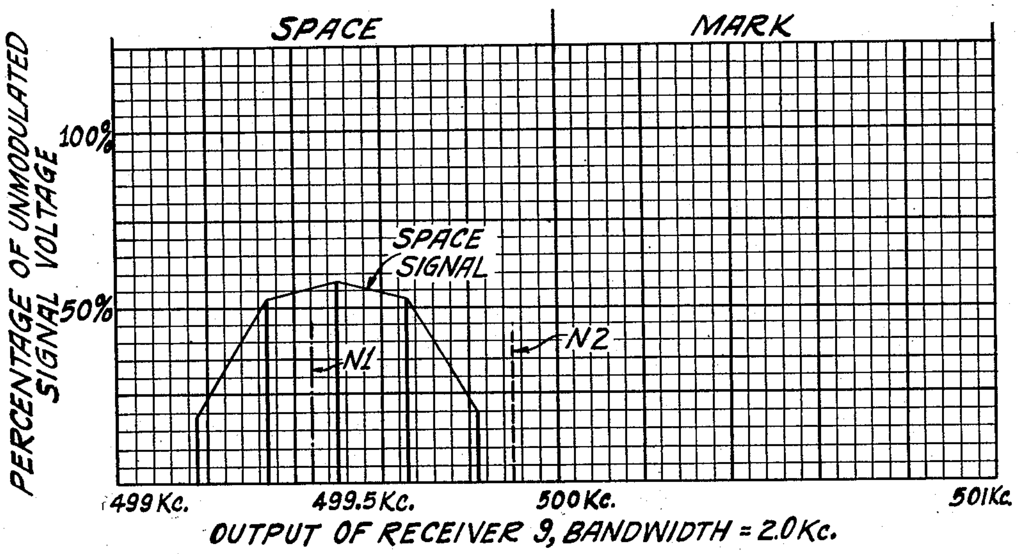
Figs. 3 and 4 are voltage-frequency charts or spectral distribution charts useful in explaining the invention.
Figure 4:
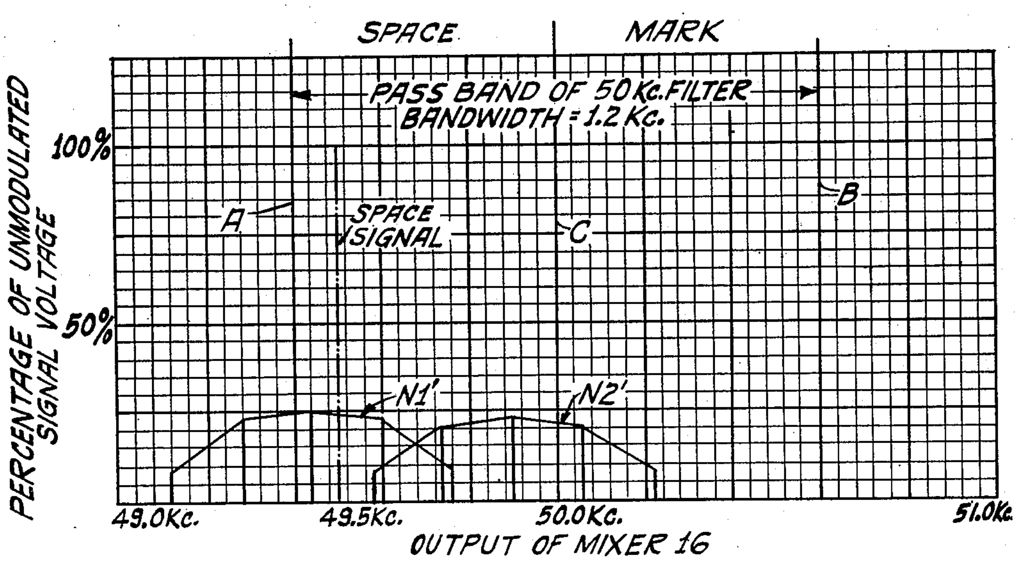

An important advantage of this invention will become apparent when reference is made to Figs. 3 and 4. These figures are spectral distribution charts or voltage-frequency charts showing the frequency spectrum distribution or sideband distribution of certain signals. For simplicity, only the sideband distribution for the "space" frequency of an FSK signal has been shown. It is to be understood, however, that relations for the "mark" frequency thereof are generally similar.

Referring first to Fig. 3, this figure represents the sideband distribution (frequency *vs.* amplitude or voltage) of the output of receiver 9 when space frequency is being received. If the center frequency of the FSK signal is 500 kc., as indicated in Fig. 2, and if the frequency shift is 1000 cycles, as previously given by way of example, the space frequency will have a nominal value of 499.5 kc. Due to the superimposed PM put on the FSK signal at the transmitter, the space signal at the output of receiver 9 will have the sideband distribution indicated by the legend "Space Signal" in Fig. 3. This would be the frequency spectrum when the PM is at a 160-cycle rate with a modulation index of 1.4 radians. The spectral distribution shown has the character of a PM sideband spectrum. The number and amplitudes of the side frequency components are determined by the modulation index given.

The output of receiver 9 also includes noise components. For illustration, two noise components N1 and N2 are shown, these noise components having the frequencies and relative amplitudes indicated. Since these noise components orginate elsewhere than in the transmitter, such components are not phase modulated at the output of 9, but appear thereat as single discrete frequencies. In other words, such components are not modulated. The noise component N1 has a frequency quite close to the space frequency of 499.5 kc. The noise component N2 has a frequency outside of the frequency limits of the sideband components of the phase modulated space signal, but yet well within the 2000-cycle bandwidth of receiver 9. The frequency of N2 is close to the center frequency of 500 kc.

Fig. 4 represents the sideband distribution of the output of mixer 16 when space frequency is being received. The nominal frequency of oscillator 15 being 450 kc. and the frequency shift of the FSK signal being 1000 cycles, the center frequency of mixer 16's output is 50 kc. and the space frequency is 49.5 kc. Due to the PM of heterodyne oscillator 15 at a rate of 160 cycles and a modulation index of 1.4 radians, the PM is removed from the FSK signal in mixer 16. Therefore, the space signal sidebands shown in Fig. 3 are eliminated in mixer 16, giving a space signal as indicated in Fig. 4. This space signal no longer has any sideband spectrum or side-frequency components, such as originally result from the superimposed phase modulation. It is now a single discrete frequency with an amplitude of 100 per cent, as indicated at "Space Signal" in Fig. 4.

Since the oscillator 15 is phase modulated, the mixer's PM action phase modulates the noise components or noise frequencies passing therethrough. The noise component N1 is therefore converted to the spectral distribution shown at N1'. This distribution has the character of a PM sideband spectrum. The number and amplitudes of the side frequency components are determined by the given modulation index. The PM spectra in both Figs. 3 and 4 can be determined or predicted by the use of Bessel relationships. It will be noted that the action of mixer 16 spreads the noise energy out to the form illustrated at N1'.

From a comparison of Figs. 3 and 4, it may be seen that the noise-energy-spreading action of the present invention can be used to greatly improve the signal-to-noise ratio. The ratio of the space signal amplitude to the amplitude of the greatest component of N1' in Fig. 4, is substantially greater than the ratio of the amplitude of the greater space signal component to the noise signal amplitude N1, in Fig. 3.

In Fig. 3, the amplitudes of the noise components N1 and N2 are less than the peak signal voltage. However, this invention is operative to spread the noise energy, in the manner indicated in Fig. 4, even when the peak noise voltage is greater than the peak signal voltage. This invention is therefore applicable even when the latter conditions exist.

Similarly, the mixer's PM action converts the noise component N2 of Fig. 3 to the spectral distribution shown at N2'. Again, this is a typical PM sideband spectrum, the side-frequency components being determined by Bessel relationships. Again, the noise energy is spread out to the form illustrated at N2'. This spreading effect can be used to greatly improve the signal-to-noise ratio.

The limits of the passband of filter 17 are indicated by vertical lines A and B in Fig. 4. It will be noted that a portion of the noise spectrum N1' extends to the left or low-frequency side of line A. In other words, a portion of noise component N1 is spread out beyond the limits of the passband of the 50-kc. filter 17. The output of the filter 17 will therefore contain phase modulated noise N1' with some of the sidebands eliminated. In other words, this noise has an amplitude modulation component. There is a limiter in the adaptor 18, which will reduce substantially this amplitude modulation component, thus further reducing the noise energy under these conditions. This effect will further improve the signal-to-noise ratio.

A certain type of frequency shift adaptor (which might be used at 18) utilizes separate mark and space filters and detectors which are coupled through a low pass filter to control a common signal utilization means. In Fig. 4, the space filter would pass frequencies between lines A and C, while the mark filter would pass frequencies between lines C and B. When noise components such as N2 appear near the center frequency of the transmitted FSK signal, the PM of the noise (see N2') will cause components of the noise to appear in both the mark and space channels. It will be noted that some of the components of N2' lie between lines A and C, and the rest between lines C and B. When the action of the low pass filter is considered, the result of this is in effect a cancellation of some of the noise energy. This is so because in this type of adaptor we are interested only in the difference between the signals in the two channels, and the noise components tend to equalize in the two channels.

The following analogy may be helpful for understanding the operation of this invention. Suppose we wish to take a picture of a pendulum. A requirement of the picture is that background of the picture be eliminated. We can obtain a clear picture of the pendulum if we start the pendulum oscillating and place our camera on a similar pendulum which is in synchronism with the object pendulum. The background will be blurred beyond recognition because of the relative motion between the camera and the background. In this analogy, the object we wish to take a picture of corresponds to the signal and the background corresponds to the noise. The movement of the object pendulum corresponds to the PM put on the signal at the transmitter and obtained at the receiver. Movement of the camera corresponds to PM of the local oscillator at the receiver.

The suggested rate and modulation index of the superimposed PM are not to be considered optimum. Other rates and modulation indices may be used. The two intermediate frequencies (500 kc. and 50 kc.) are used solely for the sake of illustration.

This system could be used for diversity reception, as well as for single receiver reception. It could also be used for on-off telegraphy, but in this case the rate of PM must be quite high.

The bandwidth required for the transmission of FSK signals with superimposed PM as disclosed herein is not excessive, since the rate of PM is not high at 160 cycles.

It is also to be noted that the equipment required for the receiver of Fig. 2 is not unduly complicated or complex. Each of the separate units is rather simple in design and construction.

What I claim to be my invention is as follows:

In a frequency shift radio telegraph system wherein the intelligence is transmitted by two alternatively-present radio carrier frequencies separated by an amount in the audio frequency range and representing mark and space signals and wherein the transmitted signal is also phase modulated by a particular frequency higher than the frequency of the intelligence being transmitted, a receiver for said transmitted signal comprising a mixer to which the received signal is fed, an oscillator for supplying heterodyning energy to said mixer, a discriminator receptive of said received signal for deriving therefrom said particular frequency, a filter coupled to the output of said discriminator for passing substantially only said particular frequency, means coupled to the output of said filter for directly phase modulating said oscillator with such output to remove, in said mixer, the phase modulation from the received signal, leaving the frequency-shift-keyed carrier representing mark and space signals, and means for utilizing the intelligence contained in the frequency shift keyed carrier.

References Cited in the file of this patent

UNITED STATES PATENTS

| Number | Name | Date |
|---|---|---|
| 2,205,762 | Hansell | June 25, 1940 |
| 2,272,401 | Chaffee | Feb. 10, 1942 |
| 2,287,925 | White | June 30, 1942 |
| 2,316,017 | Peterson | Apr. 6, 1943 |
| 2,356,224 | Crosby | Aug. 22, 1944 |
| 2,362,000 | Tunick | Nov. 7, 1944 |
| 2,418,119 | Hansen | Apr. 1, 1947 |
| 2,422,664 | Feldman | June 24, 1947 |
| 2,448,055 | Silver et al. | Aug. 31, 1948 |
| 2,456,992 | Pugsley | Dec. 21, 1948 |
| 2,502,154 | Jeffers | Mar. 28, 1950 |
| 2,509,212 | Cook et al. | May 30, 1950 |
| 2,527,523 | Borst | Oct. 31, 1950 |